United States Patent
Yu et al.

(10) Patent No.: US 7,560,871 B2
(45) Date of Patent: Jul. 14, 2009

(54) BALLAST WITH SOCKET-TO-FIXTURE VOLTAGE LIMITING

(75) Inventors: Qinghong Yu, Salem, MA (US); Joseph L. Parisella, Beverly, MA (US)

(73) Assignee: Osram Sylvania, Inc., Danvers, MA (US)

( * ) Notice: Subject to any disclaimer, the term of this patent is extended or adjusted under 35 U.S.C. 154(b) by 0 days.

(21) Appl. No.: 11/734,406

(22) Filed: Apr. 12, 2007

(65) Prior Publication Data

US 2008/0252224 A1 Oct. 16, 2008

(51) Int. Cl.
H05B 41/36 (2006.01)
(52) U.S. Cl. .................................. 315/209 R
(58) Field of Classification Search ........... 315/291, 315/129, 133, 312, 177, 178, 179, 307, 224, 315/276, 277
See application file for complete search history.

(56) References Cited

U.S. PATENT DOCUMENTS

| | | | |
|---|---|---|---|
| 5,770,925 A * | 6/1998 | Konopka et al. ............ 315/225 |
| 6,504,316 B2 * | 1/2003 | Ito et al. ..................... 315/224 |
| 6,570,334 B2 * | 5/2003 | Kastner ...................... 315/119 |
| 6,639,947 B1 * | 10/2003 | Bredius ....................... 375/258 |
| 6,720,739 B2 * | 4/2004 | Konopka ..................... 315/225 |
| 7,042,161 B1 * | 5/2006 | Konopka ..................... 315/119 |
| 7,123,117 B2 * | 10/2006 | Chen et al. .................. 333/177 |
| 7,196,912 B2 * | 3/2007 | Ohta et al. ............... 363/21.03 |
| 2004/0041782 A1 * | 3/2004 | Tachibana ................... 345/102 |
| 2005/0243483 A1 * | 11/2005 | Chen et al. .................... 361/38 |

\* cited by examiner

Primary Examiner—Douglas W Owens
Assistant Examiner—Minh D A
(74) Attorney, Agent, or Firm—Shaun P. Montana

(57) ABSTRACT

A ballast (10') for powering at least one gas discharge lamp (32) comprises an inverter (100) and an output circuit (200'). Output circuit (200') includes an output transformer (230) and output connections (202, . . . ,210) for connection to one or more lamps (32,34). A secondary winding (234) of output transformer (230) includes a tap connection (240). A voltage-limiting impedance (260) is coupled between the tap connection (240) and earth ground (80). Tap connection (240) is positioned, and voltage-limiting impedance (260) is sized, so that the voltage between earth ground (80) and any of the output connections (202, . . . ,210) remains below applicable limits as dictated by regulatory and/or safety requirements.

19 Claims, 4 Drawing Sheets

BALLAST WITH SOCKET-TO-FIXTURE VOLTAGE LIMITING

FIELD OF THE INVENTION

The present invention relates to the general subject of circuits for powering gas discharge lamps. More particularly, the present invention relates to a ballast that includes an arrangement for limiting the socket-to-fixture voltages to within required limits.

BACKGROUND OF THE INVENTION

Ballasts for operating fluorescent lamps in a so-called "instant start" mode of operation are widely known in the art. Instant start operation necessitates that the ballast provide a very high voltage (e.g., 650 volts RMS or so) for properly igniting the lamps.

A popular circuit topology for realizing instant start ballasts includes a current-fed self-oscillating half-bridge type inverter and an isolated parallel resonant output circuit. This topology has been widely utilized because of its reliability and cost-effectiveness.

An example of an existing ballast 10 that incorporates the aforementioned circuit topology is described in FIG. 1. During operation, ballast 10 provides a relatively high voltage (e.g., 650 volts RMS) between output connection 210 and each of output connections 202,204 for igniting lamps 32,34. Once lamps 32,34 are ignited, ballast 10 provides a magnitude-limited current for steady-state operation of lamps 32,34.

For applications involving T8 type lamps, the high ignition voltage that is provided by ballast 10 does not present any substantial difficulties in connection with applicable regulatory or safety requirements concerning the maximum voltages that may exist between the lamp sockets (which are connected to output connections 202,204,210) and the housing of the lamp fixture (which is connected to earth ground). Thus, the circuit topology described in FIG. 1 has been widely utilized for powering T8 type lamps without violating any regulatory/safety requirements concerning maximum socket-to-fixture voltage.

For applications involving lower wattage T5 type lamps (e.g., 28 watt, 35 watt, and 40 watt T5 lamps), on the other hand, the situation is different. Lower wattage T5 lamps typically require an ignition voltage that is at about the same level (e.g., 650 volts RMS) required for T8 lamps. However, the requirements pertaining to lamp fixtures for T5 lamps typically dictate that the socket-to-fixture voltage must not exceed 430 volts RMS (i.e., 430 VAC). Unfortunately, ballast 10 is generally incapable of satisfying the dual, and conflicting, requirements of a high ignition voltage (e.g., 650 volts RMS) and a maximum socket-to-fixture voltage (i.e., less than 430 volts RMS) for applications involving T5 (or smaller diameter) lamps.

FIG. 2 depicts a simplified circuit model (i.e., an equivalent circuit) that is helpful in understanding the operation of ballast 10 with regard to socket-to-fixture voltage. The arrangement is modeled as a 650 VAC voltage source that is connected between output connections 202,210 (which, in turn, are coupled to corresponding sockets in lamp fixture 40). Output connections 202,210, and their corresponding sockets, are normally taken to be electrically isolated from lamp fixture 40 and earth ground 80. In an ideal situation, the 650 VAC voltage source is evenly distributed, such that the socket-to-fixture voltage (i.e., the voltage that exists between each lamp socket and earth ground) does not exceed about 325 VAC, which is well within the required limit of 430 VAC. In an actual ballast, however, output circuit 200 is typically significantly unbalanced due to the presence of leakage impedances and stray capacitances to earth ground. Thus, in an actual implementation of ballast 10, the 650 VAC is generally not evenly distributed, and the socket-to-fixture voltage involving at least one of the lamp sockets is likely to exceed the required limit of 430 VAC. Moreover, the structure of output circuit 200 in ballast 10 is inherently asymmetrical due to the fact that ballasting capacitors 252,254 are both coupled to a single end of secondary winding 234; that asymmetry has the effect of further contributing to the imbalance in the voltage distribution between the two lamp sockets (with respect to earth ground) under no load conditions (i.e., prior to ignition of the lamps 32,34, or when one or more of the lamps 32,24 is inoperative or removed from the lamp fixture).

As previously mentioned, the circuit topology of ballast 10 is known to be reliable and cost-effective. Although the socket-to-fixture voltage is typically not an issue when ballast 10 is used to power T8 lamps, it is a problem for applications involving T5 lamps (or smaller diameter lamps). Thus, a need exists for an approach by which the circuit topology of ballast 10 may be adapted for powering lower wattage T5 lamps, while satisfying the more stringent socket-to-fixture voltage limitations for T5 lamp fixtures. Accordingly, a ballast that realizes such an approach in an effective, energy-efficient, and economical manner would represent a considerable advance over the prior art.

DETAILED DESCRIPTION OF THE PREFERRED EMBODIMENTS

Figure 3:
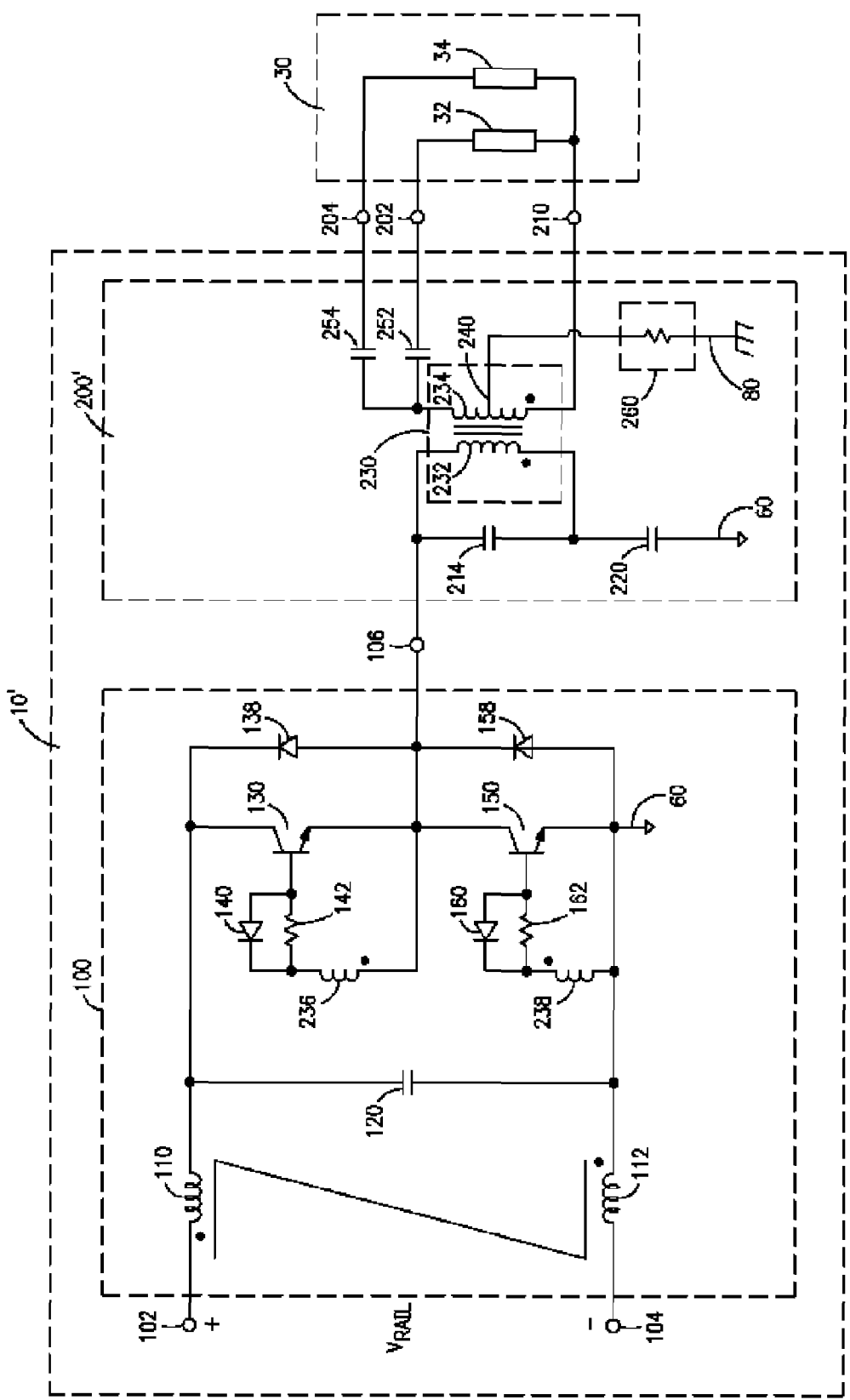
FIG. 3 describes a ballast for powering gas discharge lamps, in accordance with a preferred embodiment of the present invention.

FIG. 3 describes a ballast 10' for powering a lamp load 30 comprising one or more gas discharge lamps 32,34. Ballast 10' includes an inverter 100 and an output circuit 200'.

Figure 1:
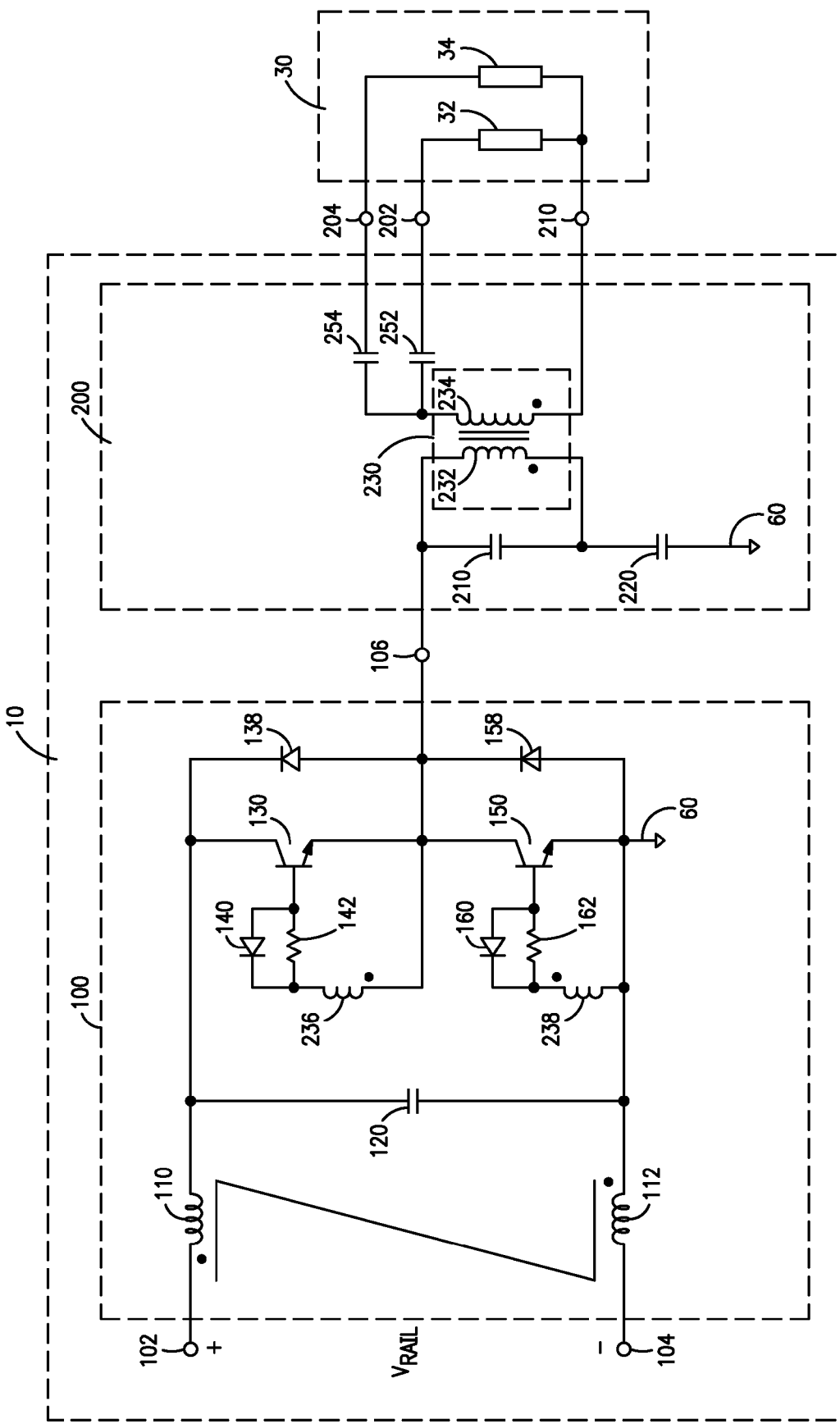
FIG. 1 describes a ballast for powering gas discharge lamps, in accordance with the prior art.
Figure 2:
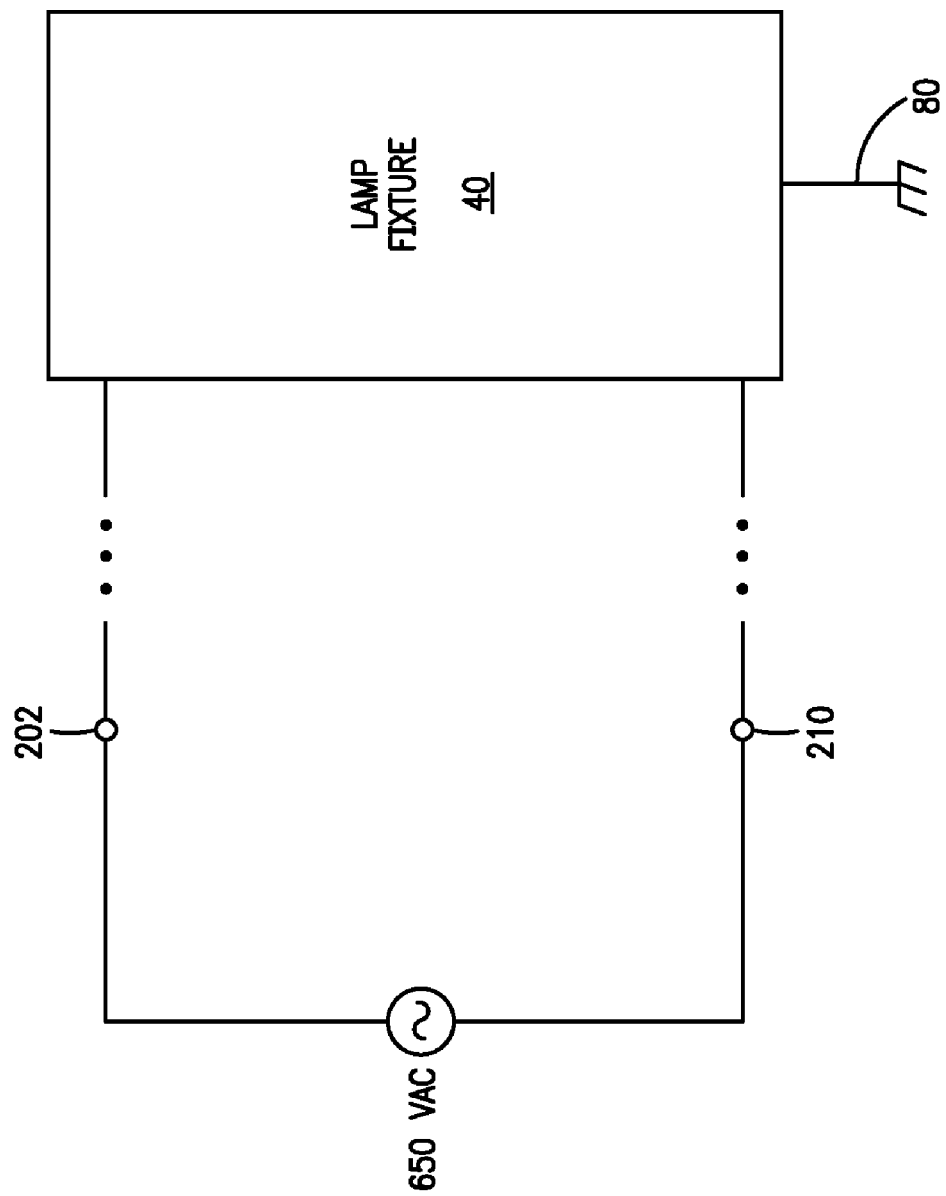
FIG. 2 describes a circuit model pertaining to the prior art ballast of FIG. 1.

Inverter 100 includes first and second inverter input terminals 102,104 and an inverter output terminal 106. During operation, inverter 100 receives (via input terminals 102,104) a source of substantially direct current (DC) voltage, $V_{RAIL}$, and provides (at output terminal 106) an alternating current (AC) output voltage. As described in FIG. 1, inverter 100 is preferably realized as a current-fed self-oscillating half-bridge type inverter, the structural and operational details of which are well known to those skilled in the art. It is contemplated, however, that inverter 100 may be realized by any of a number of alternative arrangements that are known in the art, such as a driven (as opposed to self-oscillating) half-bridge type inverter, a full-bridge type inverter, or a push-pull type inverter.

Output circuit 200' includes a plurality of output connections 202, . . . ,210, an output transformer 230, and a voltage-limiting impedance 260. The plurality of output connections 202, . . . ,210 is adapted for coupling to one or more lamps within lamp load 30 (lamp load 30 generally may include any number of lamps, but is typically limited to between one and four lamps), and minimally includes a first output connection 202 and a return output connection 210; in FIG. 3, first output connection 202 and return output connection 210 are both coupled to a first lamp 32, while second output connection 204 and return output connection 210 are both coupled to a second lamp 34. Output transformer 230 includes a primary winding 232 and a secondary winding 234. Primary winding 232 is coupled to inverter output terminal 106. Secondary winding 234 is operably coupled to first output connection 202, second output connection 204, and return output connection 210. It will be apparent to those skilled in the art that primary winding 232 and secondary winding 234 are magnetically coupled not only to each other, but also to base-drive windings 236,238 (which provide signals for controlling commutation of transistors 130,150) within inverter 100. Secondary winding 234 includes a tap connection 240 that, generally, may be positioned at any of a number of locations along secondary winding 234. Voltage-limiting impedance 260 is coupled between the tap connection 240 of secondary winding 234 and earth ground 80.

As will be further explained herein, the presence of voltage-limiting impedance 260 within output circuit 200' allows ballast 10' to be realized in a cost-effective manner (i.e., by using an economical circuit topology that includes, for example, a self-oscillating half-bridge inverter and an isolated parallel resonant output circuit), while at the same time providing ballast 10' with the capability of satisfying applicable safety/regulatory requirements regarding the maximum voltage that is allowed to occur between the lamp fixture (which is connected to earth ground 80) and each of the lamp fixture sockets (i.e, which are connected to output connections 202, . . . ,210). While ballast 10' is most advantageously utilized for powering lower wattage (e.g., 28 watt, 35 watt, and 40 watt) T5 type lamps, so as to satisfy the more stringent socket-to-fixture voltage limitations pertaining to fixtures for those lamps, it should be appreciated that ballast 10' may likewise be advantageously utilized for powering other lamp types (e.g., T8 type lamps, as well as lamps having a smaller diameter than T5 lamps).

During operation of ballast 10' and output circuit 200', a first voltage exists between first output connection 202 and earth ground 80, and a second voltage exists between return output connection 210 and earth ground 80. Due to the presence of voltage-limiting impedance 260, the first voltage and the second voltage are each limited to a root-mean-square (RMS) value of no more than about 430 volts. As previously mentioned, for applications involving T5 type lamps, relevant safety/regulatory requirements dictate a limit of 430 volts RMS for the voltages that may exist between the lamp fixture (which is connected to earth ground) and each of the lamp fixture sockets (which are connected to output connections 202, . . . ,210).

In a preferred embodiment of ballast 10' and output circuit 200', tap connection 240 on secondary winding 234 is positioned, and voltage-limiting impedance 260 is sized, such that when a voltage between first output connection 202 and return output connection 210 has a value of about 650 volts RMS (which value is typical for instant start applications involving T8 type lamps or the lower wattage—e.g., 28 watt, 35 watt, and 40 watt—T5 type lamps), a voltage between earth ground 80 and either one of first output connection 202 and return output connection 210 is limited to a value of less than about 430 volts RMS.

Preferably, and as will be explained in further detail herein, voltage-limiting impedance 260 is selected to have an impedance that is on the order of about two hundred thousand ohms.

Preferably, tap connection 240 of secondary winding 234 is a center tap; that is, tap connection 240 is preferably positioned at a mid-point of secondary winding 234. It is contemplated, however, that tap connection 240 need not be positioned precisely at a mid-point of secondary winding 234, provided of course that the resulting maximum voltages existing between earth ground 80 and each of output connections 202, . . . ,210 do not exceed the applicable limit (e.g., 430 volts RMS).

It is preferred, for purposes of simplicity and cost-effectiveness, that voltage-limiting impedance 260 be realized by a resistance. The resistance that is used to realize voltage-limiting impedance 260 may require more than one resistor, as dictated by applicable voltage and power ratings. As a guideline, it is preferred that the resistance that is used to realize voltage-limiting impedance 260 should have a resistance that is on the order of about two hundred thousand ohms, with a power rating that is on the order of about two watts.

In a preferred embodiment of ballast 10', output circuit 200' is realized as an isolated parallel resonant type output circuit that includes (in addition to the components that have already been recited herein) a resonant capacitor 214, a direct current (DC) blocking capacitor 220, and a first ballasting capacitor 252. Resonant capacitor 214 is coupled in parallel with primary winding 232 of output transformer 230. DC blocking capacitor 220 is coupled between resonant capacitor 210 and circuit ground 60. First ballasting capacitor 252 is coupled between secondary winding 234 of output transformer 230 and first output connection 202. For applications of ballast 10' that involve powering more than one lamp, output circuit 200' includes additional output connections (e.g., output connection 204, which is present when a second lamp 34 is to be powered) and ballasting capacitors (e.g., ballasting capacitor 254, which is likewise present when a second lamp 34 is to be powered) as dictated by the number of lamps to be powered by ballast 10'.

Figure 4:
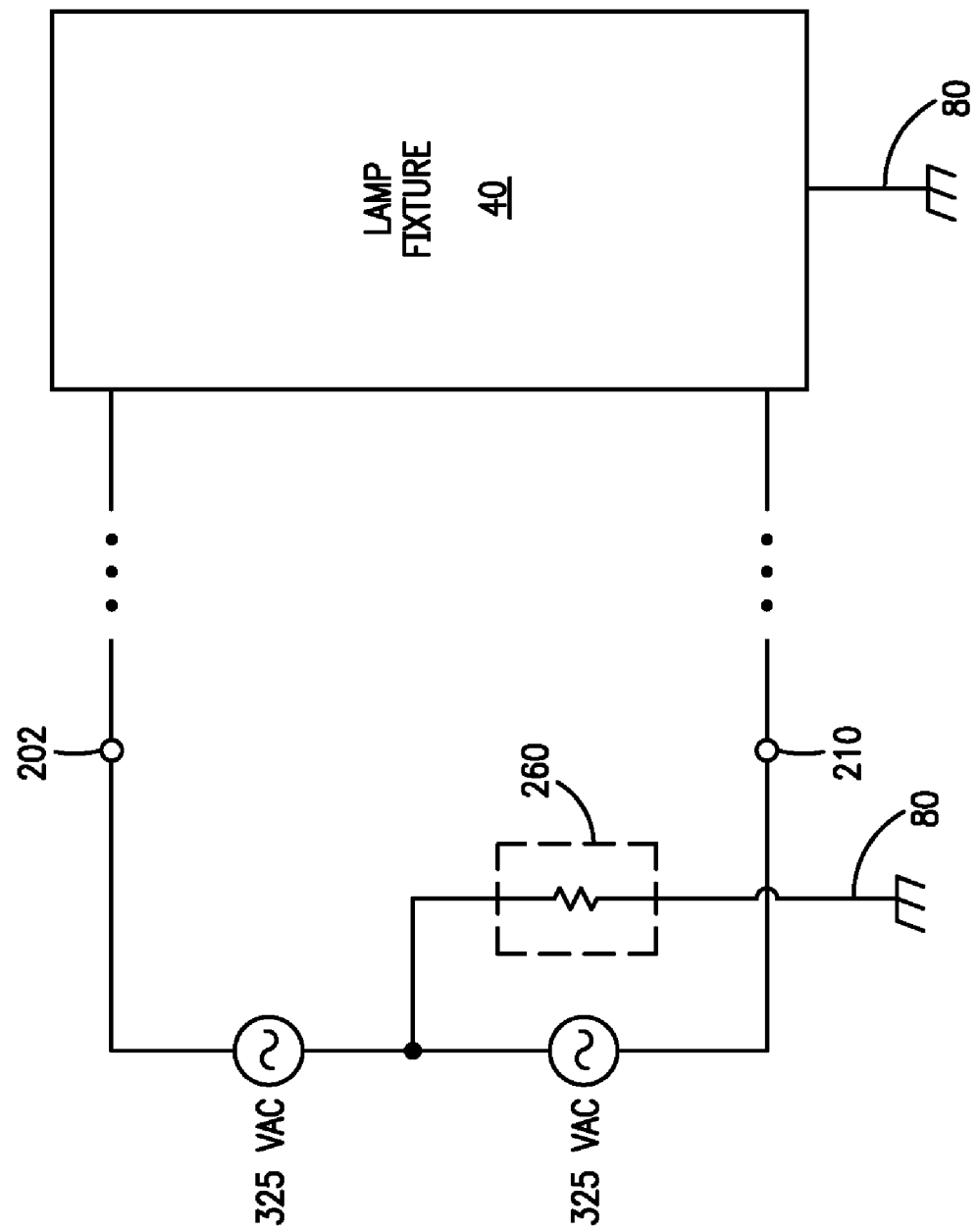
FIG. 4 describes a circuit model pertaining to the ballast of FIG. 3, in accordance with a preferred embodiment of the present invention.

FIG. 4 depicts a simplified circuit model (i.e., an equivalent circuit) that is helpful in understanding the operational effect of voltage-limiting impedance 260 in ballast 10' of FIG. 3, under a preferred configuration wherein the tap connection 240 on secondary winding 234 is a center tap. As illustrated in FIG. 4, with voltage-limiting impedance coupled to the center tap, the voltage across the secondary winding (e.g., 650 volts RMS) is effectively split into two voltage sources (each having a magnitude of 325 VAC, or 325 volts RMS). Correspondingly, and provided that voltage-limiting impedance 260 is suitably sized, the maximum voltages that can occur between output connection 202 and earth ground 80, and between output connection 210 and earth ground 80, will be safely limited to no more than 430 volts RMS. This is in contrast with prior art ballast 10 (FIG. 1), wherein at least one of the socket-to-fixture voltages that occurs between output connections 202,210 and earth ground 80 may, under typical conditions, exceed 430 volts RMS.

With regard to the sizing of voltage-limiting impedance 260, it is noted that, in order to provide effective voltage-limiting and ensure that the socket-to-fixture voltage does not exceed a limit of about 430 VAC, impedance 260 should be selected to be lower than any leakage impedance that is present between the lamp sockets (and/or secondary winding 234) and the lamp fixture (i.e., earth ground 80). On the other hand, impedance 260 must be large enough to ensure that ballast 10' complies with applicable safety standards regarding maximum allowable leakage current (as specified by Underwriters Laboratories). It is believed that an impedance on the order of about 200 kilohms is a suitable value (i.e., for the impedance of voltage-limiting impedance 260) that satisfies both of those competing requirements.

Ballast 10' thus provides a cost-effective solution for powering gas discharge lamps, particularly those of the lower wattage T5 type, while satisfying applicable limitations relating to socket-to-fixture voltage.

Although the present invention has been described with reference to certain preferred embodiments, numerous modifications and variations can be made by those skilled in the art without departing from the novel spirit and scope of this invention. For example, it will be appreciated that ballast 10' is not necessarily limited to powering two gas discharge lamps (as detailed in FIG. 3), but may be utilized for powering lamp loads that include a single gas discharge lamp or three or more gas discharge lamps.

What is claimed is:

1. A ballast for powering a lamp load comprising at least one gas discharge lamp, the ballast comprising:
   an inverter, comprising first and second inverter input terminals, and an inverter output terminal; and
   an output circuit, comprising:
      a plurality of output connections adapted for coupling to the lamp load, the plurality of output connections including a first output connection and a return output connection;
      an output transformer, comprising a primary winding coupled to the inverter output terminal, and a secondary winding operably coupled to the first output connection and the return output connection, wherein the secondary winding includes a tap connection; and
      a voltage-limiting impedance coupled between the tap connection of the secondary winding and earth ground;
   wherein the tap connection of the secondary winding is positioned, and the voltage-limiting impedance is sized, such that when a voltage between the first output connection and the return output connection has a root-mean square value of about 650 volts, a voltage between earth ground and either one of the first output connection and the return output connection is limited to a root-mean-square value of less than about 430 volts.

2. The ballast of claim 1, wherein:
   a first voltage exists between first output connection and earth ground;
   a second voltage exists between the return output connection and earth ground; and
   the first voltage and the second voltage are each limited to a root-mean-square value of no more than about 430 volts.

3. The ballast of claim 1, wherein the voltage-limiting impedance has an impedance that is on the order of about two hundred thousand ohms.

4. The ballast of claim 1, wherein the tap connection of the secondary winding is a center tap.

5. The ballast of claim 1, wherein the voltage-limiting impedance comprises a resistance.

6. The ballast of claim 5, wherein the resistance is on the order of about two hundred thousand ohms.

7. The ballast of claim 5, wherein the tap connection of the secondary winding is positioned, and the resistance is sized, such that when a voltage between the first output connection and the return output connection has a root-mean square value of about 650 volts, a voltage between earth ground and either one of the first output connection and the return output connection is limited to a root-mean-square value of less than about 430 volts.

8. The ballast of claim 7, wherein the tap connection of the secondary winding is a center tap.

9. The ballast of claim 8, wherein the resistance is on the order of about two hundred thousand ohms.

10. The ballast of claim 1, wherein the output circuit further comprises:
    a resonant capacitor coupled in parallel with the primary winding of the output transformer;
    a direct current (DC) blocking capacitor coupled between the resonant capacitor and circuit ground; and
    a first ballasting capacitor coupled between the secondary winding of the output transformer and the first output connection.

11. The ballast of claim 1, wherein the inverter is at least one of:
    a half-bridge type inverter;
    a self-oscillating type inverter; and
    a current-fed type inverter.

12. The ballast of claim 1, wherein the inverter is current-fed self-oscillating half-bridge type inverter.

13. A ballast for powering a lamp load comprising at least one gas discharge lamp, the ballast comprising:
    inverter means for receiving a source of substantially direct current (DC) voltage and for providing an alternating current (AC) output voltage; and
    output circuit means for receiving the AC output voltage of the inverter means and for providing a magnitude-limited current for operating the at least one gas discharge lamp, the output circuit means including:
       a plurality of output connections adapted for connection to the at least one gas discharge lamp; and
       a voltage-limiting impedance means for limiting a voltage between earth ground and each of the output connections to a root-mean-square value of less than about 430 volts;
    wherein the output circuit means includes an output transformer comprising a primary winding and a secondary winding, wherein a tap connection means of the secondary winding is positioned, and the voltage-limiting impedance means is sized, such that when a voltage between a first output connection of the plurality of output connections and a second output connection of the plurality of output connections has a root-mean square value of about 650 volts, a voltage between earth ground and each output connection is limited to a root-mean-square value of less than about 430 volts.

14. The ballast of claim 13, wherein:
    the inverter means is a half-bridge type inverter, comprising:
       first and second inverter input terminals adapted to receive the source of substantially DC voltage; and
       an inverter output terminal at which the inverter provides the AC output voltage; and
    the output circuit means is a parallel resonant type output circuit, comprising:
       a first output connection and a return output connection, wherein the first output connection and the return output connection are adapting for coupling to the at least one gas discharge lamp;
       an output transformer, comprising:
          a primary winding coupled to the inverter output terminal; and
          a secondary winding operably coupled between the first output connection and the return output connection, wherein the secondary winding includes a tap connection;
       a resonant capacitor coupled in parallel with the primary winding of the output transformer;

a direct current (DC) blocking capacitor coupled between the resonant capacitor and circuit ground;
a first ballasting capacitor coupled between the secondary winding and the first output connection; and
wherein the voltage-limiting impedance means is coupled between the tap connection and earth ground.

15. The ballast of claim 14, wherein the voltage-limiting impedance means has an impedance that is on the order about two hundred thousand ohms.

16. The ballast of claim 14, wherein the tap connection of the secondary winding is a center tap.

17. The ballast of claim 16, wherein the voltage-limiting impedance means comprises a resistance.

18. The ballast of claim 17, wherein the resistance is on the order of about two hundred thousand ohms.

19. A ballast for powering a lamp load comprising at least one gas discharge lamp, the ballast comprising:
a current-fed half-bridge type inverter, comprising:
first and second inverter input terminals adapted to receive a source of substantially direct current (DC) voltage; and
an inverter output terminal; and
a parallel resonant type output circuit, comprising:
a first output connection and a return output connection, wherein the first output connection and the return output connection are adapting for coupling to the at least one gas discharge lamp;
an output transformer, comprising:
a primary winding coupled to the inverter output terminal; and
a secondary winding operably coupled between the first output connection and the return output connection, wherein the secondary winding includes a center tap connection;
a resonant capacitor coupled in parallel with the primary winding of the output transformer;
a direct current (DC) blocking capacitor coupled between the resonant capacitor and circuit ground;
a first ballasting capacitor coupled between the secondary winding and the first output connection; and
a voltage-limiting resistance coupled between earth ground and the center tap connection of the secondary winding of the output transformer, the voltage-limiting resistance having a resistance that is greater than about two hundred thousand ohms;
wherein the center tap connection of the secondary winding and the voltage-limiting resistance result in, when a voltage between the first output connection and the return output connection has a root-mean square value of about 650 volts, a voltage between earth ground and either one of the first output connection and the return output connection that is limited to a root-mean-square value of less than about 430 volts.

* * * * *